United States Patent [19]
de Lauzun et al.

[11] Patent Number: 5,812,225
[45] Date of Patent: Sep. 22, 1998

[54] LIQUID CRYSTAL DISPLAY SCREEN

[75] Inventors: Frédéric de Lauzun, St Medard En Jalles; Gunther Haas, Eschau, both of France

[73] Assignees: Sextant Avionique, Velizy Villacoublay; Thomson Multimedia, Courbevoie, both of France

[21] Appl. No.: 686,705

[22] Filed: Jul. 25, 1996

[30] Foreign Application Priority Data

Jul. 25, 1995 [FR] France .................................. 95 08995

[51] Int. Cl.⁶ .................................................. G02F 1/1335
[52] U.S. Cl. ............................. 349/67; 349/95; 349/117; 349/57
[58] Field of Search ................... 349/117, 57, 67, 349/95

[56] References Cited

U.S. PATENT DOCUMENTS

| | | |
|---|---|---|
| 4,171,874 | 10/1979 | Bigelow et al. . |
| 5,150,234 | 9/1992 | Takahashi et al. ............... 349/117 |
| 5,375,006 | 12/1994 | Haas . |
| 5,459,592 | 10/1995 | Shibatani et al. ................ 349/57 |
| 5,467,206 | 11/1995 | Loiseaux et al. ................ 349/67 |
| 5,557,432 | 9/1996 | Yokota ............................ 349/95 |
| 5,600,456 | 2/1997 | Maruyama et al. .............. 349/95 |

FOREIGN PATENT DOCUMENTS

| | | | |
|---|---|---|---|
| 0 221 680 | 5/1987 | European Pat. Off. . | |
| 2 212 559 | 7/1974 | France . | |
| 62-75513 | 4/1987 | Japan | ...... 349/95 |
| 2-89025 | 3/1990 | Japan | ...... 349/95 |
| 3-223811 | 10/1991 | Japan | ...... 349/9 |
| 4-30140 | 2/1992 | Japan | ...... 349/7 |
| 6-51311 | 2/1994 | Japan | ...... 349/95 |

OTHER PUBLICATIONS

"Flat Collimator: A Backlighting Assembly Utilizing Microprisms For High Energy Efficiency," C–Y. Tai et al. SID International Symposium Digest of Applications Papers; vol. 25, Jun. 14, 1994. pp. 10–13.

"Normally White Negative Birefringence Film Compensated Twisted Nematic Liquid Crystal Displays With Improved Optical Performance," IBM Technical Disclosure Bulletin; vol. 36, No. 09B, Sep. 1993. p. 361.

"Multicolor Parallel–Oriented Nematic Liquid Crystal Displays Using Optical Compensation Films," IBM Technical Disclosure Bulletin; vol. 33, No. 12, May 1991. pp. 201–202.

Primary Examiner—William L. Sikes
Assistant Examiner—Tiep H. Nguyen
Attorney, Agent, or Firm—Oblon, Spivak, McClelland, Maier & Neustadt, P.C.

[57] ABSTRACT

A display screen for improving the angle of view from which displayed images can be perceived accurately. An illumination device produces light which is collimated along a plane YOZ orthogonal to the plane XOZ in which the screen has its best characteristics in terms of contrast and/or levels of gray. The collimated illumination device is on the front face of a cell. A device for distributing the light (by diffraction or scattering) in the plane YOZ is placed at the output of the cell. One or more compensation films can be placed at the output of the cell to increase the angle of view in the plane XOZ. This device may be used in avionics and the display of video images.

8 Claims, 7 Drawing Sheets

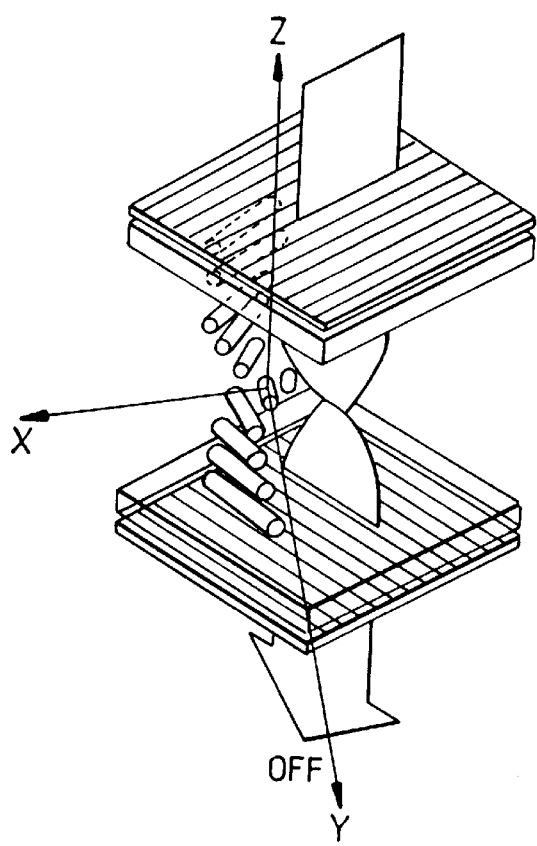
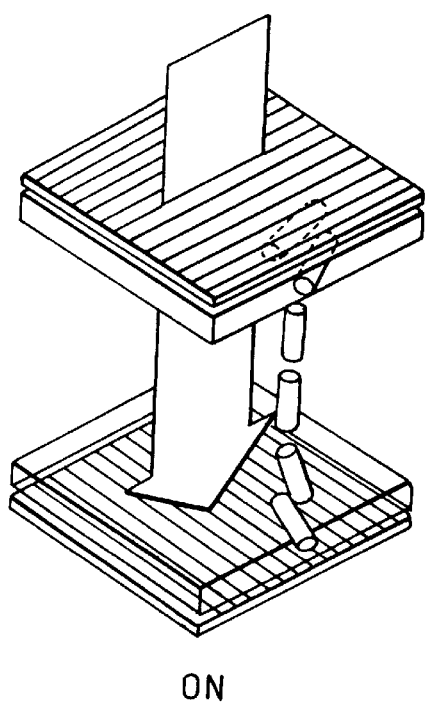
FIG.1A
FIG.1B
OFF
ON

LIQUID CRYSTAL DISPLAY SCREEN

BACKGROUND OF THE INVENTION

1. Field of the Invention

The field of the invention is that of liquid crystal display (LCD) type electrooptical display devices that directly modulate the light going through them, and can be used for computer screens, screens for avionics as well as video image displays.

These may be passive screens or direct viewing active matrix screens. In the case of active matrix screens, they would generally comprise the following elements:

- a transparent substrate on which a matrix of switching elements is made;
- a liquid crystal cell, one of whose substrates is the active matrix (the material generally used is the twisted nematic crystal);
- a second substrate on which there are deposited the colored filters of the color screens in a mosaic of elementary dots RGB;
- polarizers and a back-illumination module enabling direct vision, based on fluorescent tubes.

More specifically, in the case of an LCD using a twisted nematic liquid crystal, the molecules are oriented in parallel to the substrate by alignment layers in such a way that when there is no electrical field, they form a helix in the thickness of the cell. The cell is placed between two polarizers that are multually crossed or parallel, i.e. the polarizations are perpendicular or parallel with respect to each other.

With respect to the direction of alignment of the molecules at the level of the substrates, three axes (x, y, z) such as those shown in FIG. 1 can be defined. This figure gives a standard view of a liquid crystal cell. The direction OZ corresponds to the normal to the plane of the cell, the direction OY is defined at the center of the cell by the big axis of the liquid crystal molecules and the direction OX is perpendicular to the directions OZ and OY. In a standard way, the direction OY corresponds to the so-called vertical axis of the cell and the direction OX corresponds to the so-called horizontal axis of the cell.

Should the polarizers be crossed, the rectilinearly polarized light enters the cell, undergoes a rotation in crossing the liquid crystal layer and then goes through the second polarizer. As can be seen in FIG. 1, in this example, the device has a high transmission of light in this non-activated state since the orientation of the polarizers follows the path of the polarization within the helix. Thus, a normally white (NW) state is defined in the OFF state.

When an electrical field is applied perpendicularly to the plane of the cell, the molecules tend to get oriented in parallel to the field. The twisted structure is destroyed and the polarized light no longer undergoes any rotation when it crosses the cell so that it is absorbed by the output polarizer in the ON state.

Should the polarizers be parallel, the situation is reversed. The non-activated state corresponds to the normally black (NB) state while the excited state becomes the state in which the transparence is the highest.

In both examples, intermediate transmission may be obtained by intermediate electrical fields corresponding to a partial orientation of the liquid crystal molecules in such a way that the device enables the display of video images requiring several gray levels.

The use of colored filters and of these numerous gray levels enables the display of colored video images.

2. Description of the Prior Art

In these electrooptical display devices, one of the major problems to be resolved is that of improving the angle of view of observation of the images displayed since, by construction, these devices have high levels of non-homogeneity when the angular conditions of observation change.

Indeed, when the device is observed along the normal to the plane of the layers, it has a very high contrast (ratio of transmission in the non-activated state to transmission in the activated state). However, when the device is observed along a direction that is inclined to the normal to the plane of the cell, the transmission of the black state increases and causes a decline in the contrast along this direction.

Furthermore, when a video image is displayed by a device of this kind and observed along a direction inclined with respect to the normal to the substrate, the same phenomenon of variation of transmission affects the saturated level (the state in which the molecules have been oriented) as well as all the gray levels, but the law of the variations is different for each level. This leads to phenomena of contrast reversal, i.e. a level that is darker than another along the normal becomes lighter when this other level follows an inclined direction.

The problems of reversal of gray levels and of limited observation fields have been described with respect to a twisted nematic crystal but are encountered more generally also with STN (super-twisted nematic) type cells, Freedericks type cells (having planar structure without twisted formation, using an effect based on controlled birefringency), electrically controlled birefringency (ECB) type cells in which the molecules at rest are oriented homeotropically and have a negative dielectric anisotropy.

To resolve these problems of gray levels and limited observation fields, the following approaches have been proposed, for example:

the modification of the spatial structure of the cell by the creation in each picture element (pixel) of several domains within which either the orientation of the molecules of the liquid crystal on the substrate of the cell or the orientation of the electrical field applied or the intensity of this field is different. However, this approach leads to a greater complexity of the domain;

the addition of a so-called compensation and birefringent film. This is a film of molecules having a negative dielectrical anisotropy, enabling the improvement of the characteristics of the black state and hence the contrast. This method makes it possible to widen the horizontal zone for which there is a good contrast but not the vertical zone.

Now the invention relies on the analysis according to which for most of the electrooptical effects used in liquid crystal display (LCD) devices, (whether of the twisted nematic type or the super-twisted nematic type), an angular behavior is observed at the level of the perceived images that is different in two planes of symmetry:

* in a first plane, with the plane xoz defined here above corresponding in a standard way to the horizontal plane, the angular characteristic is practically symmetrical with respect to the normal. The contrast is fairly high even for values of incidence that are fairly high with respect to the normal to the cell, and the problem of the reversal of the gray levels is not very great;

* in a second plane, with the plane yoz defined here above corresponding in a standard way to the vertical plane, the angular characteristic is not symmetrical, showing in particular a maximum off-axis contrast for the intermediate levels, this maximum shifting towards higher angles. Consequently, this gives rise to major reversals of gray levels in half of this second plane.

To illustrate this phenomenon, FIGS. 2b and 3b depict the progress of the transmission of the function of the angle of incidence from which a twisted nematic type of liquid crystal cell is observed between crossed polarizers, for different applied voltages. FIG. 2 pertains to the horizontal plane, with FIG. 2a illustrating the distribution of the liquid crystal molecules in the addressed state of the cell. FIG. 3 pertains to the vertical plane, with FIG. 3a illustrating the distribution of the liquid crystal molecules also in the excited state of the cell. This FIG. 3a reveals the origin of the dissymetry of contrast evoked here above (the gray reversals are shown in FIGS. 2b and 3b by transmission curves that overlap).

Typically, in the case of the display of video images using a twisted nematic type cell, the usable angle of view is limited to ±30° C. horizontally between −25° and +5° vertically to obtain a minimum contrast of 10 and no gray reversal.

It may be noted that, for other applications such as avionics, it may also be essential to maintain the readable information elements on the screen even for an angular movement of the pilot with respect to his screen.

The observation of different behavior of the characteristics of the liquid crystal cells in terms of contrast and/or of gray levels in different planes is general with respect to the different types of cells (TN, STN, Freedericks, ECB) referred to here above, and it is generally possible, on the basis of a direction OZ that is normal or substantially normal to the plane of the cell, to define a plane XOZ in which the angular characteristic in terms of contrast and/or gray level is the most favorable as much as in a plane YOZ perpendicular to said plane XOZ.

SUMMARY OF THE INVENTION

To overcome the inadequacies of behavior in the plane YOZ with respect to the screen, the invention is aimed at sending a collimated illumination along this plane YOZ on the liquid crystal cell to distribute light at output from the cell along this same plane YOZ.

Thus, an object of the invention is a liquid crystal display screen comprising an illumination device, a liquid crystal cell, said cell possessing the most favorable characteristic, in terms of contrast and/or in terms of gray levels in a plane XOZ, if O is the central point of the cell and OZ is a direction that is normal or substantially normal to the plane of the cell, wherein said screen comprises:

means to collimate the light flux coming from the illumination device in a plane YOZ orthogonal to the plane XOZ, said means being located on the same side as the illumination device with respect to the cell;

means to distribute the light flux along the plane YOZ, said means being placed on the side opposite the illumination device with respect to the cell.

In the context of cells in which the molecules are oriented in a planar way, an object of the invention is a liquid crystal display screen comprising an illumination device, a liquid crystal cell comprising, between two substrates, liquid crystal molecules oriented in a direction that is planar with respect to the substrate, the large axis of the molecules defining, at the center of the cell at a point O, a direction OY wherein the screen comprises:

means to collimate the light flux coming from the illumination device in a plane $P_1$ defined by the direction OY and the direction OZ that is normal or substantially normal to the plane of the cell, said means being located on the same side as the illumination device with respect to the cell;

means to distribute the light flux along the plane $p_1$, said means being placed on the side opposite the illumination device with respect to the cell.

The means to distribute the light flux may be scattering means or refraction means (in this case, the means may be an array of microlenses).

To improve the display screen according to the invention, it is possible to combine the collimation/distribution means used in the plane YOZ with a compensation film enabling an increase in the angle of view in a plane XOZ orthogonal to the plane YOZ.

When the light distribution means are scattering means, these means may advantageously be of the holographic type, thereby enabling the limiting of the back-scattering phenomena as shall be explained here below.

BRIEF DESCRIPTION OF THE DRAWINGS

The invention will be understood more clearly and other advantages shall be appear from the following description, given by way of a non-restrictive example, and from the appended figures, of which:

FIG. 1 illustrates a standard configuration of a twisted nematic liquid crystal display screen observed between crossed polarizers;

MORE DETAILED DESCRIPTION

The invention shall be described in the context of a display screen using liquid crystal cells with a planar orientation (TN, STN, Freedericks type cells) but can also be applied to ECB type cells.

In general, the display screen comprises means of collimation in one plane only. This type of collimation is very well suited to standard cylindrical light sources such as, for example, fluorescent tubes which are generally used in conventional back-illumination systems.

Collimation in one plane only, coupled with scattering in this same plane, furthermore has the advantage of generating a weaker back-scattering than that which would have been generated with a system of collimation/scattering in two planes. In certain applications such as that of the screens for avionics, this problem of back-scattering represents a major problem owing to the high ambient luminosity.

Figure 4:
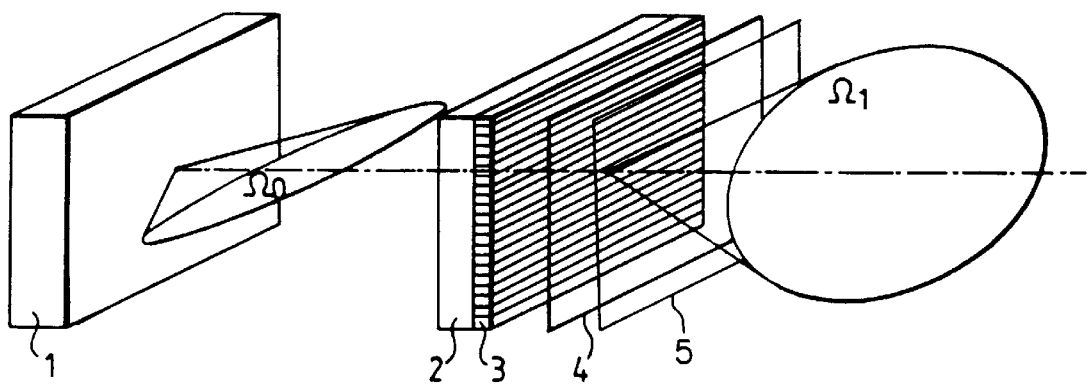
FIG. 4 gives a schematic view of a display screen according to the invention.

FIG. 4 gives a schematic view of a display screen according to the invention comprising:

an illumination system 1 collimated in the vertical plane, i.e. the light flux at 50% of luminance is included in a plane YOZ often corresponding to the vertical plane with a divergence that may typically range from ±1° to ±20°, and in a horizontal plane with a divergence ranging from ±15° to ±90°, defining the solid angle $\Omega_0$;

a liquid crystal cell 2 inserted between two polarizers;

one or two optional compensation films 3 enabling an improvement of the angle of view in the plane XOZ often corresponding to the horizontal plane;

means 4 to distribute the light in the vertical plane in a solid angle $\Omega_1$ which, for example, may be a system of microlenses or a holographic scattering device;

an optional polarizer 5 that can be used to reduce the back-scattering.

To validate the concept of the invention, namely to use a system of collimation/scattering in one plane, it is important to ascertain that the spatial resolution obtained with a display screen according to the invention remains quite satisfactory and that the information elements coming from different pixels do not get mixed for the observer placed on the scattering device side with respect to the liquid crystal cell.

Figure 5:
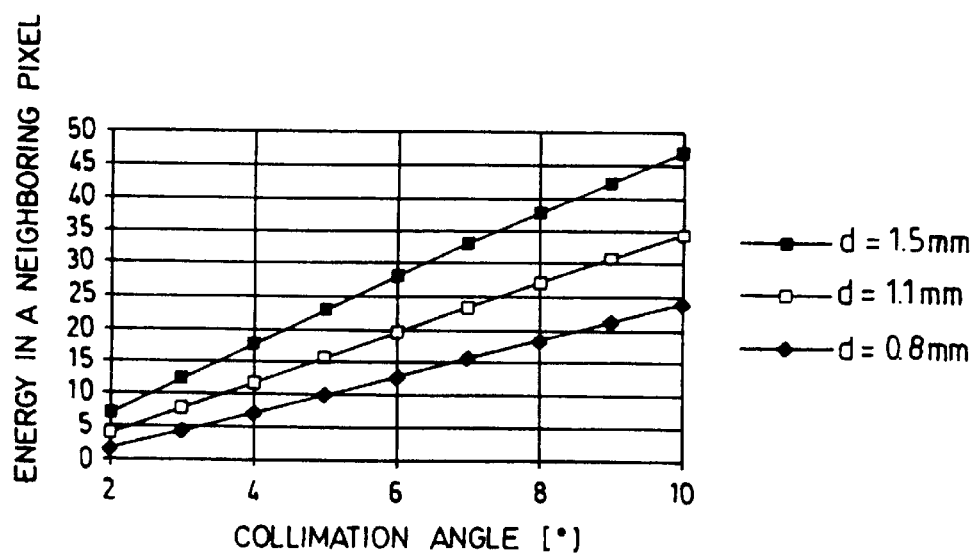
FIG. 5 illustrates the progress of the percentage of energy coming from a cell and being mixed with the energy coming from a neighboring cell in an exemplary display screen according to the invention.

Thus it can be shown that, for a screen having pixels whose size along the plane YOZ is 270 µm (the standard dimension) separated by a black matrix with a width of 30 µm, the percentage of energy coming from a pixel and getting mixed with the energy coming from a neighboring pixel remains low. To illustrate this characteristic, FIG. 5 shows this percentage of energy in the case of a collimation at ±5 and for different thicknesses of the unit formed by the substrate of the liquid crystal cell, the scattering system and the output polarizer.

Exemplary embodiments

In general, the illumination device may comprise fluorescent tubes coupled to reflectors that fulfil the collimation function.

The shape of the reflector may be totally or partially parabolic. It may take the form of optical concentrators as described for example in Welford and Winston, *High Collection Non-Imaging optics,* Academic Press, 1989. The reflector may also be a simple reflective film bonded around the fluorescent tube.

1. Systems of back-illumination collimated in a plane

Figure 6:
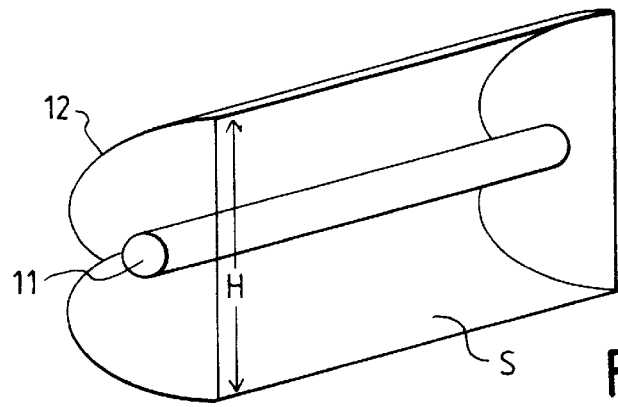
FIG. 6 illustrates a first exemplary embodiment of a device combining back-scattering and collimation means used in a screen according to the invention.

In a first exemplary embodiment, the collimation of the light is obtained along the plane YOZ coming from the source by means of a fluorescent tube 11 in a reflector 12 that is a parabolically shaped optical concentrator as shown in FIG. 6. In this case, the collimation angle is determined by the ratio between the height H of the reflector and the surface S corresponding to the circumference of the tube inserted into the reflector.

The back-illumination system may consist of a single element as has just been described or of a linear array of such elements attached to the plane of the liquid crystal cell.

Figure 7:
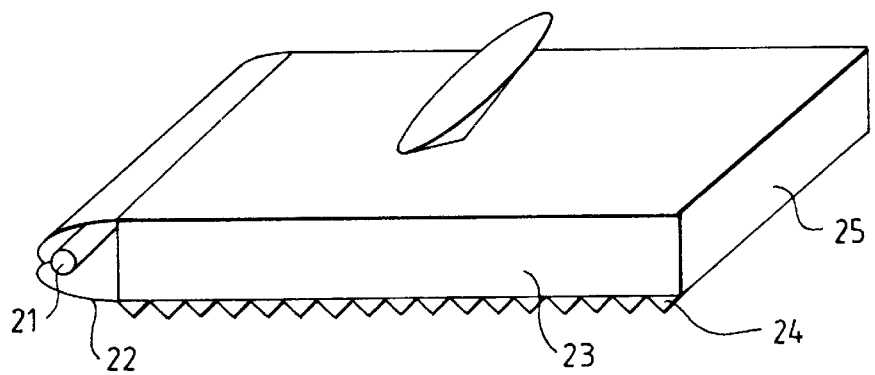
FIG. 7 illustrates a second exemplary embodiment of a device combining back-scattering and collimation means used in a screen according to the invention.
Figure 8:
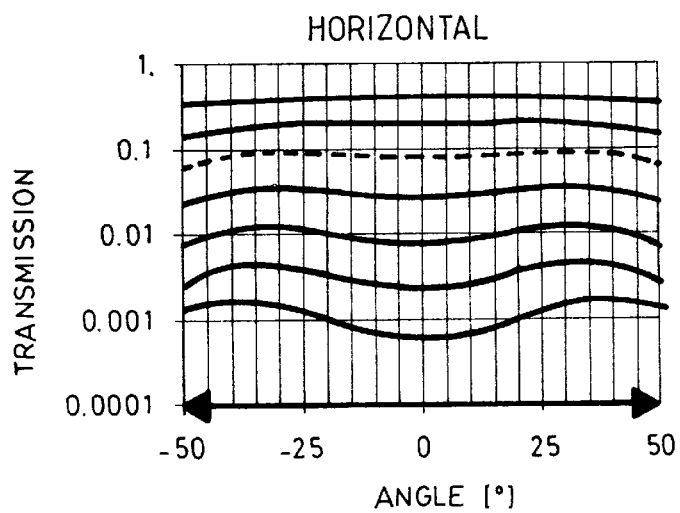
FIG. 8 illustrates the progress of the transmission as a function of the angle of view in a horizontal plane for a twisted nematic liquid crystal cell using a compensation film.

In a second variant shown in FIG. 7, a fluorescent tube 21 is inserted into the parabolically shaped reflector 22. The assembly is coupled to a plane waveguide 23 (glass or plastic plate for example). The light emerges from the guide by specular reflection on an array of microprisms 24: this reflection is either total reflection or reflection on a reflective layer (for example aluminium) deposited on the array. On the other slice of the waveguide 25, it is possible to attach either a reflective layer or a second assembly consisting of a fluorescent tube and a reflector.

2. Liquid crystal cell

As an electrooptical material, the cell may comprise any type of liquid crystal capable of passing from a transparent state to a dark state. In particular, it may be a nematic crystal organized in the cell in twisted nematic (TN) form by means of an anchoring at the particular substrates of the cell.

It may be a cholesteric-based cell constituting a supertwisted nematic (STN) type cell.

It may also be, as referred to here above, a Freedericks cell.

It may also be a ECB cell.

To optimize the performance characteristics as regards angle of view in a display screen according to the invention, the liquid crystal cell may advantageously be coupled to one or more compensation films.

For example, in the case of a TN type cell working between crossed polarizers it is possible to use one or more compensating films (for example delaying plates) mounted between the polarizers and the liquid crystal cell. The films may be placed on either side of the cell. Typically, they may be stretched polyvinylalcohol (PVA) or polycarbonate (PC) films. When a foil of PVA or PC is stretched in a certain direction, a birefringent material is obtained with an ellipsoid having a refraction index such that this ellipsoid resembles a cigar, the long axis of the cigar being aligned in the direction of the stretching. Films of this kind are commercially distributed by the firm Nitto.

For the compensation of a twisted nematic cell as described, it is necessary to have a material with an ellipsoid having a refraction index such that this elllipsoid resembles a flat plate. This can be obtained by stretching the foil in two perpendicular directions to obtain a negative birefringency capable of compensating for the positive birefringency of the nematic liquid crystal.

Alternately, the flat plate can be replaced by two films of the crossed-cigar type. This works very well if what is sought is the angular characteristic in one plane only (which is typically the case of the invention).

Typically, if this difference of index in the liquid crystal is such that the difference in step $\Delta n.e$ is close to 475 nm within the cell (e being the thickness of the cell, $\Delta n$ the difference between the ordinary index and the extraordinary index), there are compensating films available such that they compensate for this difference at a height of about 340 nm.

Figure 2A:
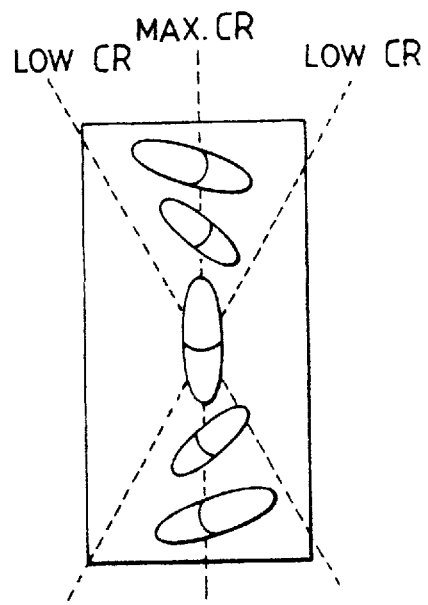
FIG. 2a illustrates the distribution of the liquid crystal molecules in the addressed state of the cell in a horizontal plane.
Figure 2B:
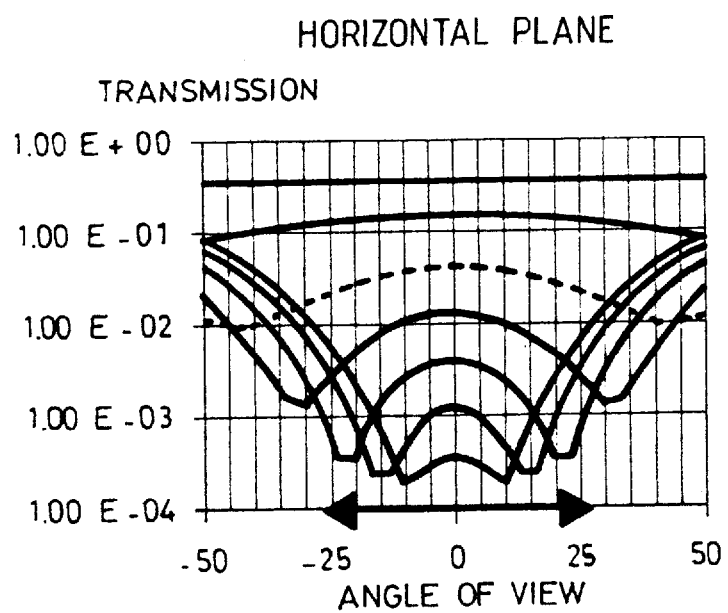
FIG. 2b illustrates the progress of the transmission of a twisted nematic cell as a function of the angle of observation with respect to the normal to the plane of the cell in a horizontal plane for different voltages applied to the cell.
Figure 3A:
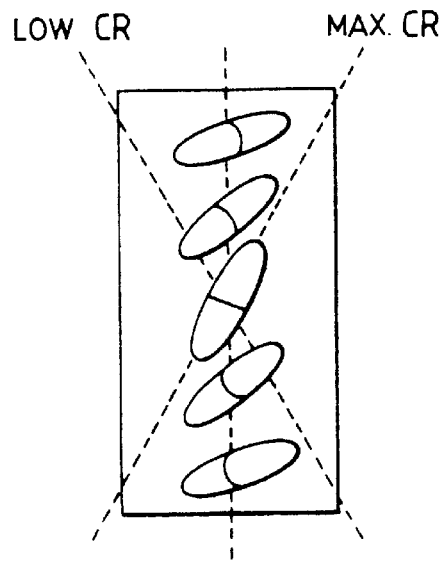
FIG. 3a illustrates the distribution of the liquid crystal molecules in the addressed state of the cell in a vertical plane.
Figure 3B:
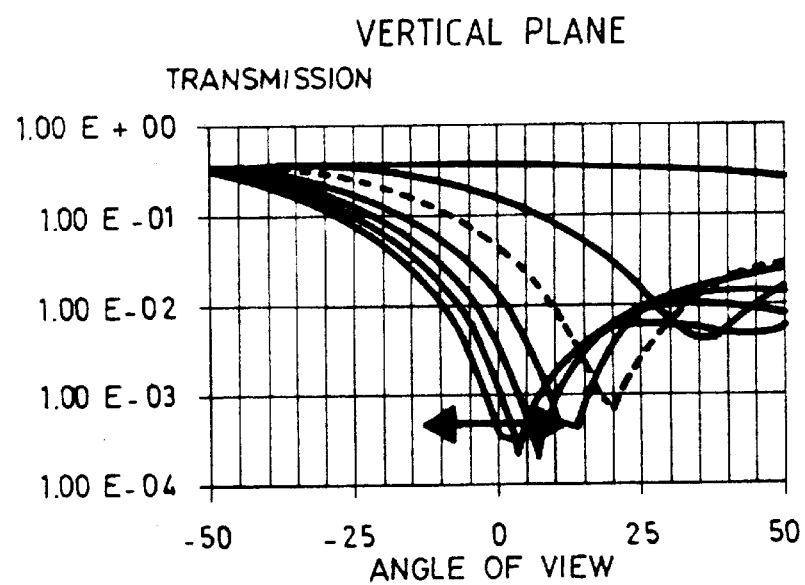
FIG. 3b illustrates the progress of the transmission of a twisted nematic cell as a function of the angle of observation with respect to the normal to the plane of the cell in a vertical plane for different voltages applied to the cell.
Figure 10A:
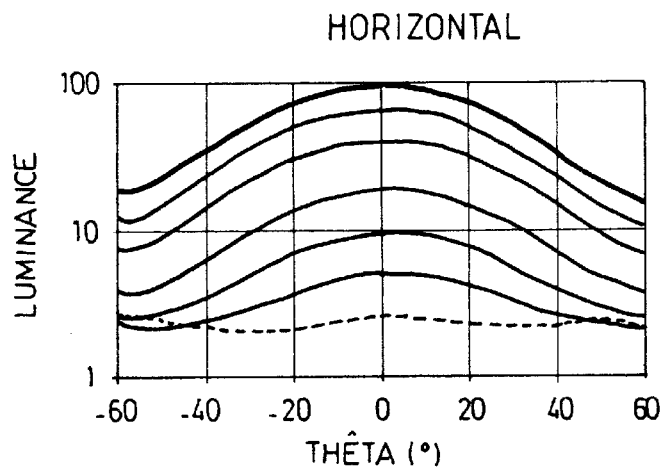
FIGS. 10a, 10b and 10c illustrate the progress of the luminance as a function of the angle of view in the horizontal, inclined and vertical planes for a twisted nematic liquid crystal screen according to the invention.
Figure 10B:
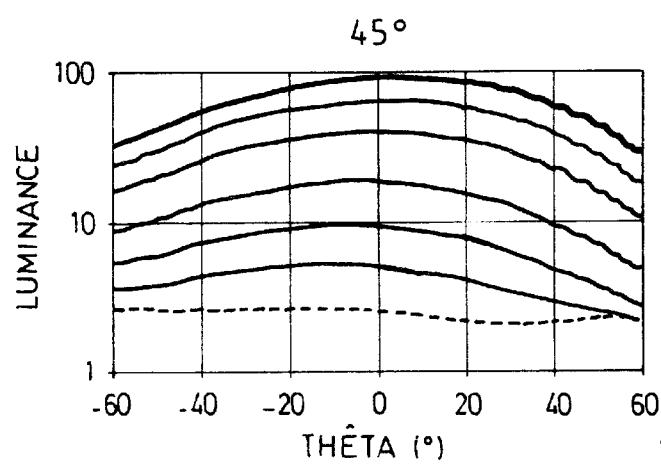
Figure 10C:
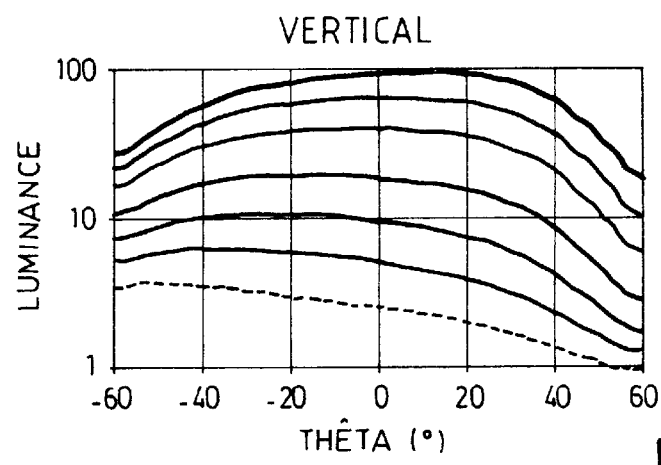

FIG. 10 illustrates these performance characteristics by showing the progress of the transmission as a function of the angle of view in a horizontal plane for the same control voltages as those indicated in FIG. 2 applied to the same type of cell but without any compensation film.

3. Means of scattering light in a plane

The distribution means may be of the microlens array type.

The scattering means used in the display screen according to the invention may advantageously be of the holographic type.

It may be recalled that a hologram records the interferences between an object wave $O_0$ and a reference $O_r$. Once the hologram is developed it restores the object wave if it is illuminated by the reference wave.

In the case of a holographic scatterer, at the time of the recording, the object wave is constituted by the wave coming from a scattering device illuminated by a plane wave, said scattering device being placed in parallel to the holographic medium in which it is sought to record interferences. This medium may be a photosensitive medium of the photopolymer type or bichromated gelatin type capable of recording the intensity of the interference pattern between the two waves in the form of a variation in refraction index (phase hologram).

The developed hologram restores the scattered wave $O_s$ if it is illuminated by a wave identical to the reference $O_i$ during the recording.

If the Bragg conditions are verified by the recorded grating, namely $2\pi d\lambda/n_o\Lambda^2 >> 1$ with d thickness of the hologram $\lambda$ recording wavelength $n_o$ average index of the photosensitive medium $\Lambda$ average pitch of the grating.

All the energy of the wave $O_i$ called a reading wave may be redirected in the chosen direction with a chosen scattering lobe.

It must be noted that this type of scattering device is extremely selective especially for the back-scattering of the ambient illumination since it generates back-scattering only in the direction of the wave $O_i$.

To obtain the phase grating in the film used, it is also possible to make a raised grating structure of the surface hologram type. At present, holographic scattering devices such as these are items that are commercially distributed by POC (Physical Optics Corporation, Tonance Calif.).

Exemplary display screen according to the invention

The performance characteristics of a display screen have been assessed in the following example:

1. The back-illumination system uses a waveguide made of acrylic with aluminium-coated microprisms, the illuminated surface area being 70×90 mm².
2. A liquid crystal cell of the twisted nematic type in crossed-polarizer mode (Toshiba reference TFD 40 W 13-MS) without compensation film.
3. A holographic scattering device (Optics Corporation reference LSD 20°×80°, i.e. collimation at ±10° and ±40°).
4. An additional polarizer after the scattering device. An additional polarizer, at output of the scattering device, enables an increase in the contrast in ambient light since the polarization of a wave going through the scattering device is essentially preserved while the polarization of a back-scattered wave is essentially destroyed. Its polarization is chosen to be parallel to that of the polarizer located at output of the liquid crystal cell.

The following angles of view are obtained for the screen according to the invention and for the same screen without a single-axis collimation/scattering device:

| Angle of view | Screen according to the invention | Prior Art Screen |
| --- | --- | --- |
| Horizontal | ±45° | ±45° |
| Vertical | −50°, +60° | −10°, +15° |

Figure 9A:
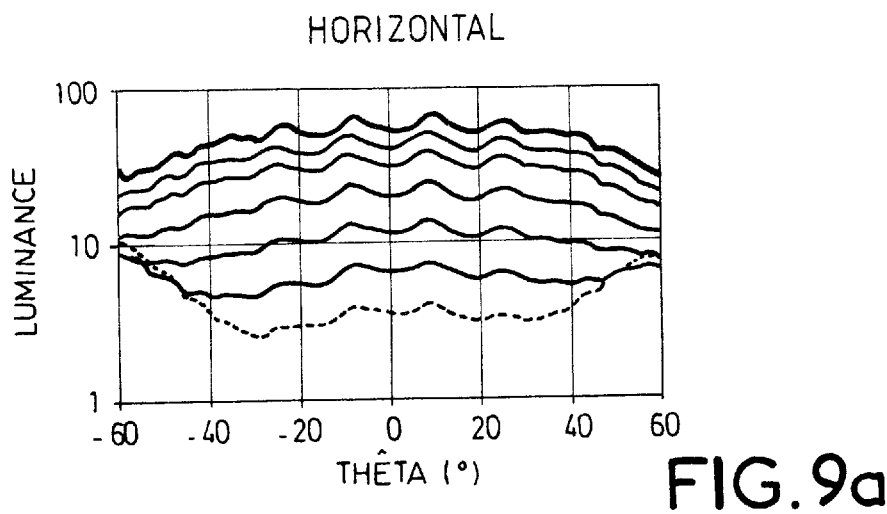
FIGS. 9a, 9b and 9c illustrate the progress of the luminance as a function of the angle of view in the horizontal, inclined and vertical planes for a twisted nematic liquid crystal screen according to the prior art.
Figure 9B:
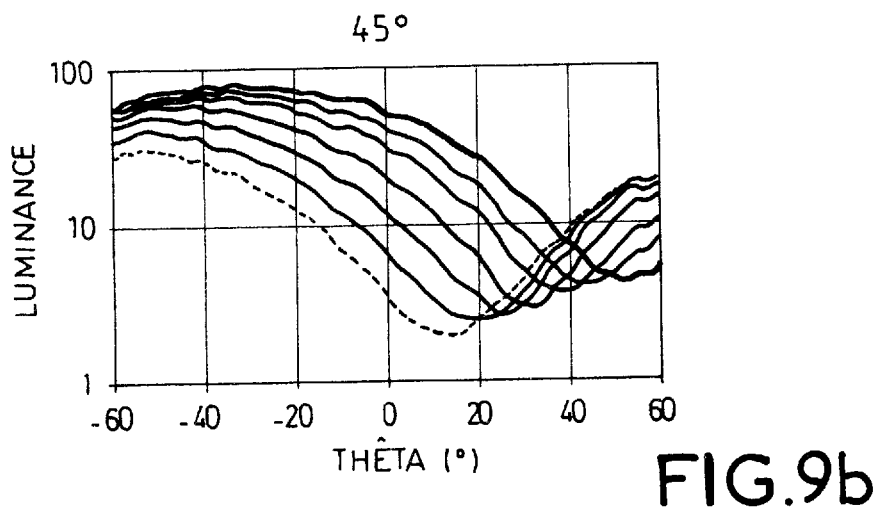
Figure 9C:
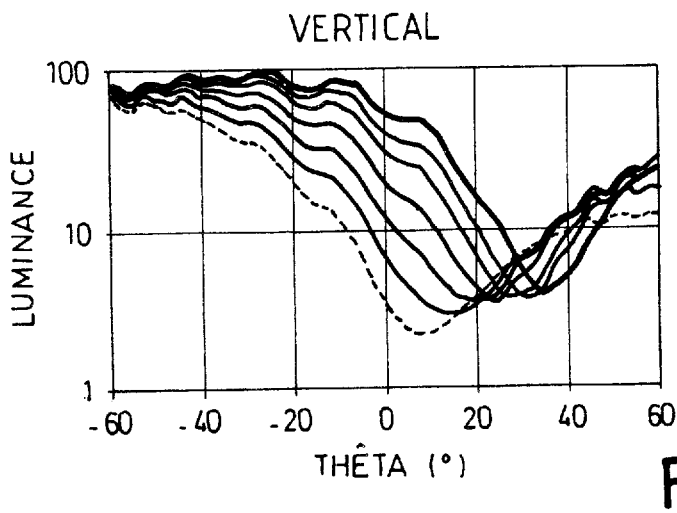

Furthermore, FIGS. 9 and 10 illustrate the luminance as a function of the angle of view in a horizontal plane, in a 45° plane and in a vertical plane respectively for a prior art screen and for the screen according to the invention and for different control voltages. It can be seen very clearly from these figures that the problem of reversal of gray has been resolved through the display screen proposed in the invention.

Given the description of the display screen according to the invention, the performance characteristics obtained in terms of angle of view are better vertically than they are horizontally.

Depending on the applications in view, it may be chosen to obtain the best possible performance characteristics in the horizontal plane. For this purpose, the directions of alignment of the liquid crystal are rotated with respect to the conventionally chosen orientations so as to have, at the center of the cell, liquid crystal molecules whose big axis is horizontal. The collimation/scattering means are, in this case, used in the horizontal plane.

Furthermore, it must be noted that, for most of the LCD devices, the best characteristic in terms of contrast is not achieved in a plane perpendicular to the plane of the cell but in a plane that is slightly inclined with respect to the normal to the plane of the cell.

For example, for the twisted nematic effect, in crossed-polarizer mode, the best characteristic in terms of contrast is obtained in a plane inclined from 5° to 15° with respect to the normal. In this example, the direction OZ therefore forms a slight angle with the normal to the plane of the cell. It is therefore possible to improve the performance characteristics of the system of the invention by using a back-scattering system 1 adapted so as to collimate in a plane identical to that in which the device performs most efficiently.

Typically, when a back-scattering device is used with a set of fluorescent tubes and parabolic reflectors coupled to a waveguide with microprisms on the rear face, a simple modification of the angle of the prisms will enable the set goal to be achieved.

The device according to the invention using a system for the collimation of light at entry into the cell also makes it possible advantageously to consider the use of the colored filters at the considered output substrate, outside said substrate. This represents a major advantage in terms of cost and technological ease (for example in photographic type printing to obtain filters outside the cell).

Indeed, a collimated back-illumination system can be used to have a certain distance between the liquid crystal layer and the layer of colored filters. In order not to reduce the saturation of colors, it is necessary nevertheless to envisage a fairly small collimation angle of ±1° to ±7° and also relatively small substrate thicknesses (about 0.7 mm).

Furthermore, by placing the scattering means at a certain distance from the output substrate of the liquid crystal cell, it is possible to partly eliminate the visibility of the colored filters (when these are arranged in stripes) by slightly mixing the light beams coming from each of the colored filters R, G, B.

What is claimed is:

1. A liquid crystal display screen comprising:

an illumination device producing a light flux;

a liquid crystal cell, said cell having the most favorable characteristic in terms of one of contrast and gray levels, in a plane XOZ, where O is the central point of the cell and OZ is a direction that is substantially normal to the plane of the cell;

means to collimate the light flux in a plane YOZ orthogonal to the plane XOZ, said means to collimate being located on the same side of the cell as the illumination device;

means to distribute light flux along the plane YOZ, said means to distribute being placed on the opposite side of the cell as the illumination device; and at least one compensation film located between the liquid crystal cell and the means to distribute, said film enabling an increase in light flux that is homogenous in the plane XOZ.

2. A display screen according to claim 1, wherein the liquid crystal cell comprises, between two substrates, liquid crystal molecules oriented in a direction that is planar with respect to the substrate, the large axis of the molecules defining, at the center O of the cell, the direction OY enabling the plane YOZ to be defined.

3. A display screen according to one of the claims 2 and 1, wherein the illumination device and the collimation means include at least one fluorescent tube inserted into a cylindrical or parabolic reflector.

4. A display screen according to claim 3, wherein said fluorescent tube inserted into a reflector, is located on the lateral face of a waveguide whose face opposite to the liquid crystal cell comprises means to extract the light in a manner collimated towards said cell.

5. A display screen according to claim 4, wherein the means to extract the light consist of an array of microprisms.

6. A display screen according to claim 1, wherein the means to distribute the light in the plane YOZ comprise an array of microlenses.

7. A display screen according to claim 1, wherein the means to distribute the light in the plane XOZ comprise a holographic scattering device.

8. A display screen according to claim 1, comprising a polarizer at output of the light distribution means.

* * * * *